US007969676B2

(12) United States Patent
Buch et al.

(10) Patent No.: US 7,969,676 B2
(45) Date of Patent: Jun. 28, 2011

(54) INTERSPERSED PHASE-LOCKED LOOP FIELDS FOR DATA STORAGE MEDIA SYNCHRONIZATION

(75) Inventors: Bruce Douglas Buch, Westborough, MA (US); Mehmet Fatih Erden, Pittsburgh, PA (US); Barmeshwar Vikramaditya, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 96 days.

(21) Appl. No.: 12/267,305

(22) Filed: Nov. 7, 2008

(65) Prior Publication Data

US 2010/0118428 A1    May 13, 2010

(51) Int. Cl.
*G11B 27/36* (2006.01)
(52) U.S. Cl. ............................................. 360/31; 360/48
(58) Field of Classification Search .................. None
See application file for complete search history.

(56) References Cited

U.S. PATENT DOCUMENTS

| 7,006,316 B1 * | 2/2006 | Sargenti et al. ............ 360/51 |
| 7,643,235 B2 * | 1/2010 | Erden et al. ............... 360/51 |
| 2010/0128384 A1 * | 5/2010 | Shibano ................... 360/75 |

* cited by examiner

*Primary Examiner* — Daniell L Negrón
*Assistant Examiner* — Regina N Holder
(74) *Attorney, Agent, or Firm* — Braden Katterheinrich (57) ABSTRACT

Techniques are described for providing media-referenced timing for operations on a data storage medium. In particular, Phase-Locked Loop (PLL) synchronization fields may be interspersed within data fields of the medium and may be read to obtain timing measurements. The PLL fields are illustratively pre-recorded at predetermined intervals on the medium and have a fixed number of dots of the bit patterned medium between the PLL fields. Phase and frequency of a write clock may be controlled based on the read PLL fields to translate the timing measurements from the PLL fields into phase and frequency corrections to synchronize the write clock to the data storage medium.

19 Claims, 7 Drawing Sheets

INTERSPERSED PHASE-LOCKED LOOP FIELDS FOR DATA STORAGE MEDIA SYNCHRONIZATION

CROSS REFERENCE TO RELATED APPLICATIONS

The present application is related to the following commonly-owned U.S. Patent Applications, the content of each of which are incorporated herein by reference: U.S. Publication No. US2008/0080082, published Apr. 3, 2008, by Mehmet Fatih Erden et al., entitled SYNCHRONIZATION FOR DATA COMMUNICATION; U.S. Pat. No. 7,889,450, filed on Nov. 7, 2008, by Barmeshwar Vikramaditya et al., entitled REDUCED READ/WRITE TRANSITION OVERHEAD FOR STORAGE MEDIA; U.S. Publication No. US2010/0118426, filed on Nov. 7, 2008, by Barmeshwar Vikramaditya et al., entitled WRITE CLOCK CONTROL SYSTEM FOR MEDIA PATTERN WRITE SYNCHRONIZATION; U.S. Publication No. US2010/0118433, was filed on Nov. 7, 2008, by Bruce Douglas Buch et al., entitled A WRITE COMPENSATION SYSTEM; U.S. Pat. No. 7,876,517, filed on Nov. 7, 2008, by Bruce Douglas Buch et al., entitled MEASUREMENT OF ROUND TRIP LATENCY IN WRITE AND READ PATHS; and U.S. Publication No. US2010/0118427, filed on Nov. 7, 2008, by Bruce Douglas Buch et al. for ELIMINATING SECTOR SYNCHRONIZATION FIELDS FOR BIT PATTERNED MEDIA.

BACKGROUND OF THE INVENTION

The invention relates generally to data storage media devices, e.g., disk drives and related technologies.

Data storage media, such as disk drives, may comprise one or more magnetic disks on which information may be stored as corresponding magnetic polarities. For example, a series of information bits, e.g., "1010" may be stored on the magnetic media as magnetic transitions corresponding to +1, −1, +1, −1. Conventionally, using what is known as "continuous magnetic media," there is no strong requirement for the accuracy of the absolute positions of the written data positions. With continuous media, preambles, or training patterns, are written as part of the write operations, to depict the start of a data sector and the start of the data within the sector. In addition, the training patterns provide timing information for read clock synchronization, since the training patterns are written at the same time as the data using a fixed frequency write clock. As sectors are re-written, the starting points may vary slightly, and thus, read operations must re-synch at the start of each sector to ensure alignment of the read operation to the start of the data as well as the timing of the data.

With continuous magnetic media, the system reads a given sector by locating the associated training pattern and synchronizing a variable frequency read clock to the frequency and phase of the pattern as read from the medium. The synchronizing of the read clock is required to overcome differences in disk speed between the read and write operations, differences in fly height, and so forth. At the start of the sector the read clock is brought into frequency and phase synchronization with the recorded training pattern by a read channel digital phase lock loop. After the read clock is synchronized to the training pattern data, the read clock is synchronous with the data, which was recorded at the same time using the same fixed-frequency write clock.

Bit patterned media ("BPM"), on the other hand, is a relatively new technique used in magnetic data storage that provides patterns of magnetic regions (e.g., "dots" or "islands") within non-magnetic material. In contrast to conventional continuous magnetic media, for efficient use of BPM capacity, write operations to BPM must be aligned such that write current transitions are synchronized with the patterns of dots. Synchronization is also required for reading the magnetic states of the dots.

SUMMARY OF THE INVENTION

The present invention is directed to techniques for providing media-referenced timing for operations on a data storage medium. In particular, Phase-Locked Loop (PLL) synchronization fields may be interspersed within data fields of the medium and may be read to obtain timing measurements. The PLL fields are illustratively pre-recorded at predetermined intervals on the medium and have a fixed number of dots of the bit patterned medium between the PLL fields. Phase and frequency of a write clock may be controlled based on the read PLL fields to translate the timing measurements from the PLL fields into phase and frequency corrections to synchronize the write clock to the data storage medium.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
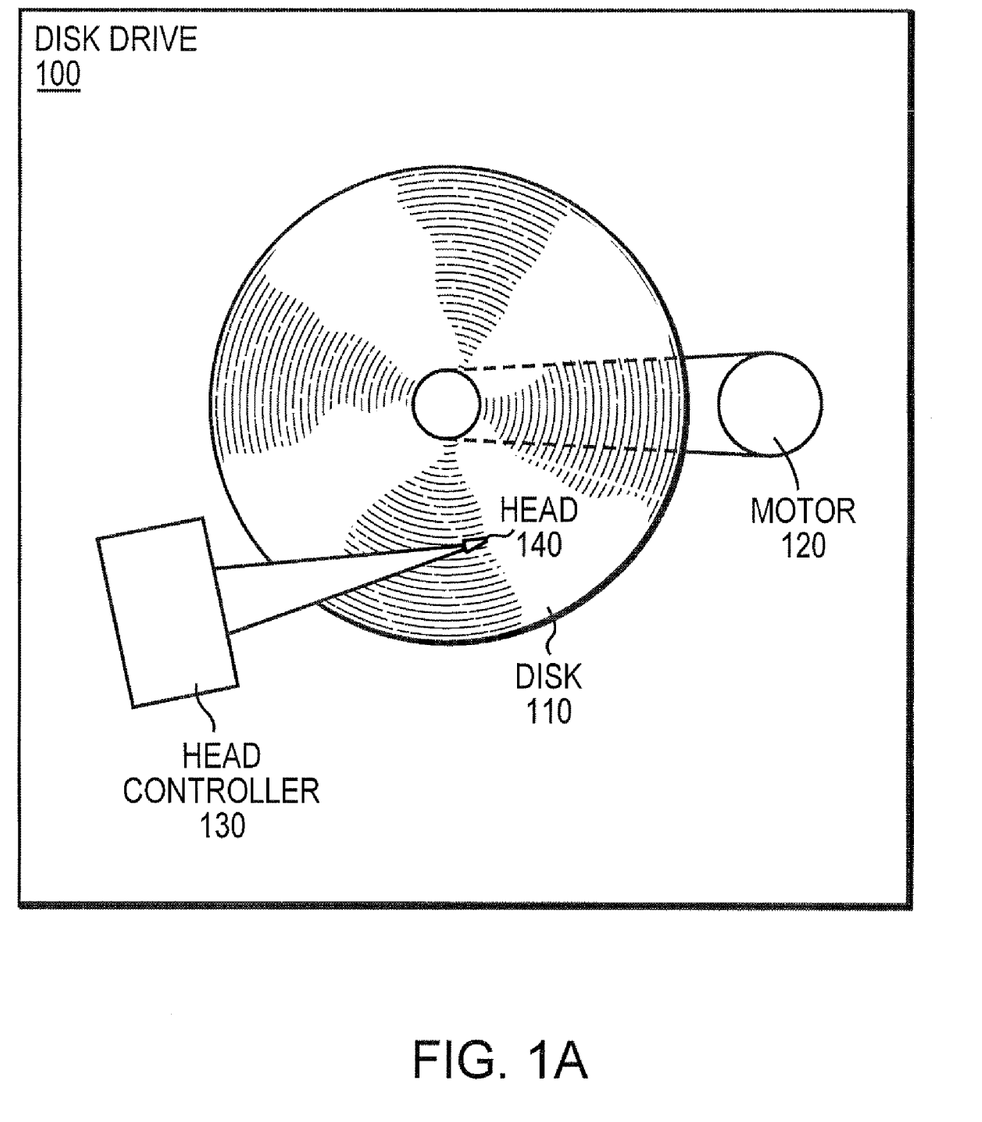
FIG. 1A illustrates an example disk drive.

Briefly, FIG. 1A illustrates an exemplary disk drive 100 that comprises a magnetic recording medium, such as a magnetic disk 110, that advantageously may be used in accordance with the illustrative embodiments. The disk 110 may comprise, for example, a magnetic recording layer deposited on a substrate, as will be understood by those skilled in the art. The disk also may contain other magnetic or non-magnetic layers, such as a soft magnetic underlayer, exchange-coupled layer, lubrication layer, carbon overcoat, etc., which are not explicitly shown. The recording layer may be fabricated using various ferromagnetic materials and alloys, e.g., embodied as thin-film or particulate media, and may be deposited on the substrate using a variety of deposition techniques known in the art, in particular, in accordance with bit patterned media (BPM) as described herein. The substrate also may be constructed from various materials, such as glass or conventional aluminum-magnesium substrates used for magnetic disks. The disk drive 100 may also comprise a motor 120 used to spin the disk 110, as well as a head controller 130 to control a read-write head 140, as will be understood by those skilled in the art and as described herein (e.g., to control clock synchronization).

Figure 1B:
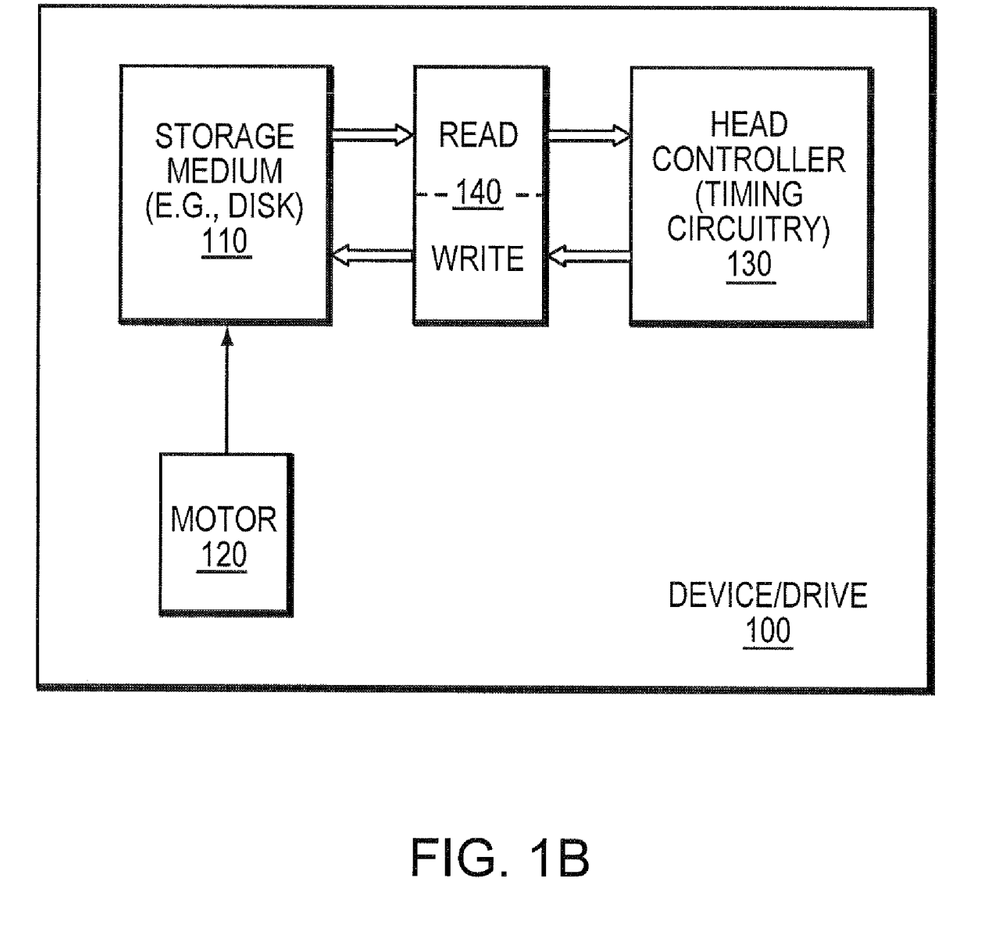
FIG. 1B illustrates an example block diagram of the disk drive of FIG. 1A.

Referring now to FIG. 1B, which has elements in common with FIG. 1A, a read-write head 140 reads information from and writes information to the disk 110, which is spun by the motor 120. The head controller 130 (e.g., circuitry used to control the track, position, timing, phase, etc. of the reading and writing operations and circuitry) receives information (e.g., data or timing information) from the read-write head 140, and provides information to the read-write head, as described herein.

Illustratively, the media (e.g., disk 110) is arranged as BPM, which provides patterns of magnetic regions (e.g., "dots" or "islands") within non-magnetic material (e.g., "troughs"). For efficient use of the BPM storage capacity, write operations to BPM should be aligned such that write current transitions are synchronized with the patterns of dots, i.e., efficient use of BPM capacity requires tight synchronization of the write clock to the phase and frequency of the media itself (i.e., to the dots). As noted above, the write operations, if not synchronized to the dots, may be attempting to write between the dots on the non-magnetic areas of the media or dots may be skipped, thereby reducing the effective storage capacity of the media.

According to the present invention, techniques provide for sampled observation of write clock timing offset relative to dot timing when writing, where the timing signals are read from respective phase-lock loop (PLL) fields. A control scheme adjusts the phase of the write clock used in the subsequent data field for writing discerned from calibrations, and, through continually-applied injections, adjusts the frequency of the write clock based on the timing offsets, which are determined using the signals previously read from the PLL fields. The write clock timing then coasts in between PLL fields, while a write operation continues with a write clock having updated phase and frequency. When the reader arrives at a next PLL field, data writing is suspended while timing information is extracted from the PLL field.

Figure 2:
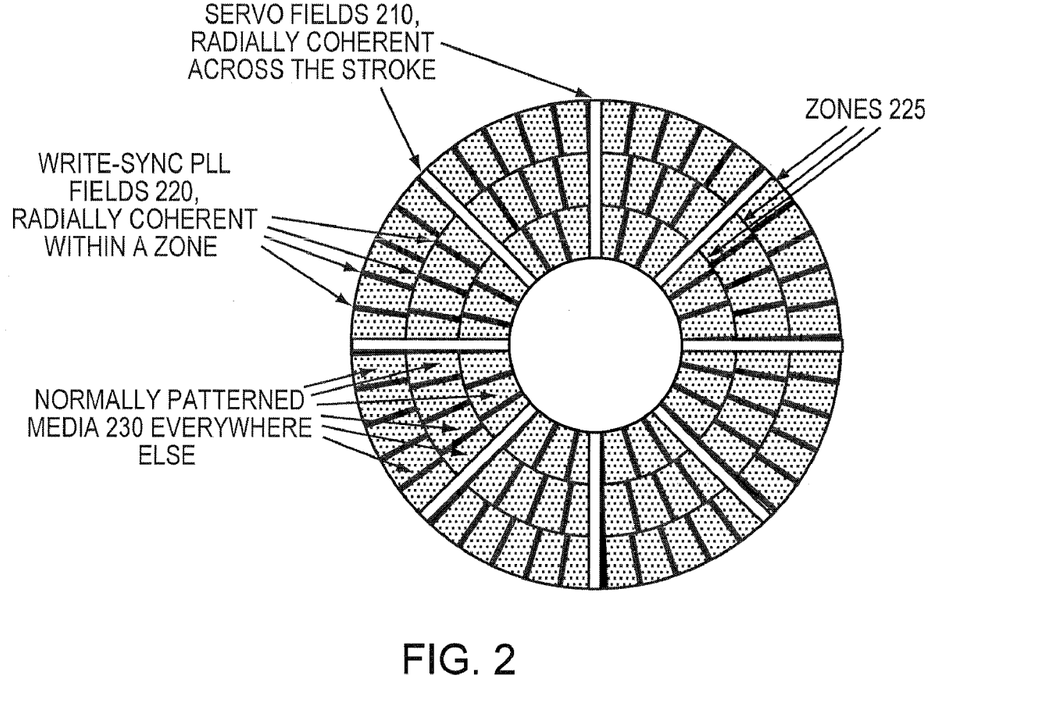
FIG. 2 illustrates an example view of information stored on a media having interspersed PLL fields.
Figure 3:
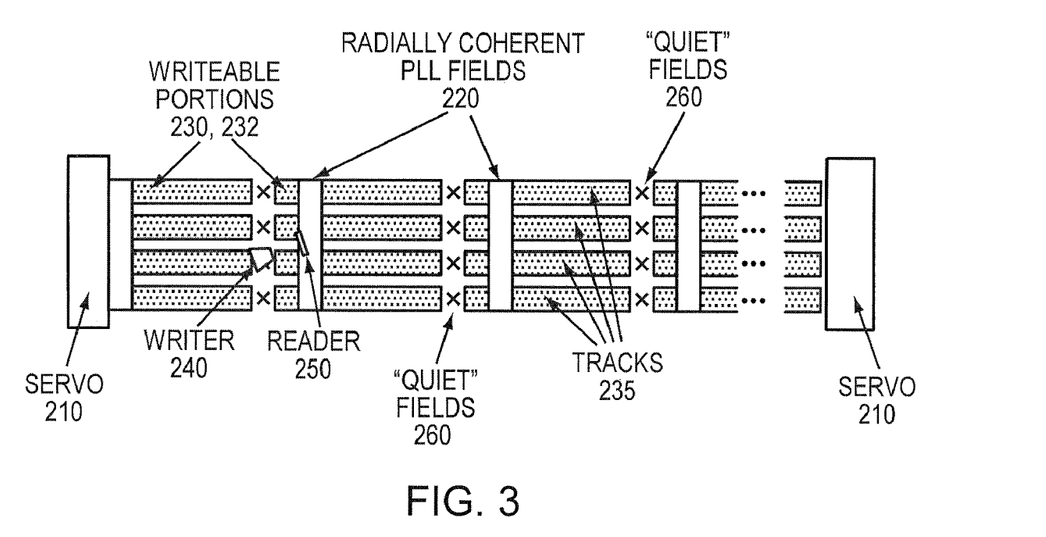
FIG. 3 illustrates an above view of the format of an example printed media to support the logical format shown in FIG. 2.

FIG. 2 illustrates the format of BPM (e.g., disk 110) to support the logical format shown in FIG. 3. For sake of context, FIG. 2 shows various servo fields/areas 210 and PLL fields 220, but makes no assumptions about servo field position relative to the PLL fields. It is assumed, for now, that the PLL fields 220 occur more frequently than the servo fields.

The servo fields 210 are radially coherent across the disk surface. In the example, the PLL fields 220 are radially coherent within a "zone" 225. Within a zone, the same number of dots occur between PLL fields, and thus, the radially coherent PLL fields are read at regular dot intervals (where being radially coherent within a zone implies that the same signal may be read from a read head position anywhere across the zone). Since the PLL fields provide a timing reference for the zone, this per-zone radial coherence is consistent with the patterning of data dots for constant-density recording per-zone. In other words, each data portion 230 between a pair of PLL fields 220 within a zone illustratively comprises the same number of dots, spaced at a same linear frequency according to the radial position of the zone on the underlying disk surface. Illustratively, the dot pattern of the PLL fields 220 provide readback of a signal that is recorded with a predetermined number of dots per cycle (e.g., 1, 1, −1, −1, etc.).

The data are written to and read from the regions 230 between the interspersed PLL fields. While making these PLL fields aligned to logical block boundaries would simplify format control, such alignment is not necessary. Rather, in the example, the data areas are interrupted with the permanently written (e.g., "read-only"), radially coherent PLL fields 220. The "X's" illustrate unused areas in the format that roughly match the length of the interspersed PLL fields. These "quiet" fields 260 correspond to the position of the writer 240 when the reader 250 is over the radially coherent PLL fields 220.

FIG. 3 illustrates an example view of information stored on a BPM having interspersed PLL fields. In particular, between conventional servo fields 210, one or more PLL fields 220 may be interspersed at predefined intervals within writeable fields 230 of tracks 235 (e.g., four shown). A read-write head 140 is illustrated, with a writer 240 and a reader 250 that are separated by a known distance. Notably, an illustrative PLL field comprises a known pattern that produces a periodic read-back waveform with a known period of four dots, e.g., ++−− ("bipolar") or ++00 ("unipolar"), referred to as a 4T-per-cycle dot pattern.

As noted, according to the present invention, when writing data fields 230, the signals read from the interspersed PLL fields 220 are sampled for use in updating the phase and frequency of the write clock relative to the media. Data writing is suspended during the reading of the PLL fields, to obviate the complications of read-while-write operations and circuitry. Thereafter, data writing is resumed in sections 232 of the data fields, which are also referred to herein as "runt" data fields. Note that the length of the runt fields 232 roughly corresponds to the nominal writer-reader separation (i.e., the distance between writer 240 and reader 250).

Figure 4:
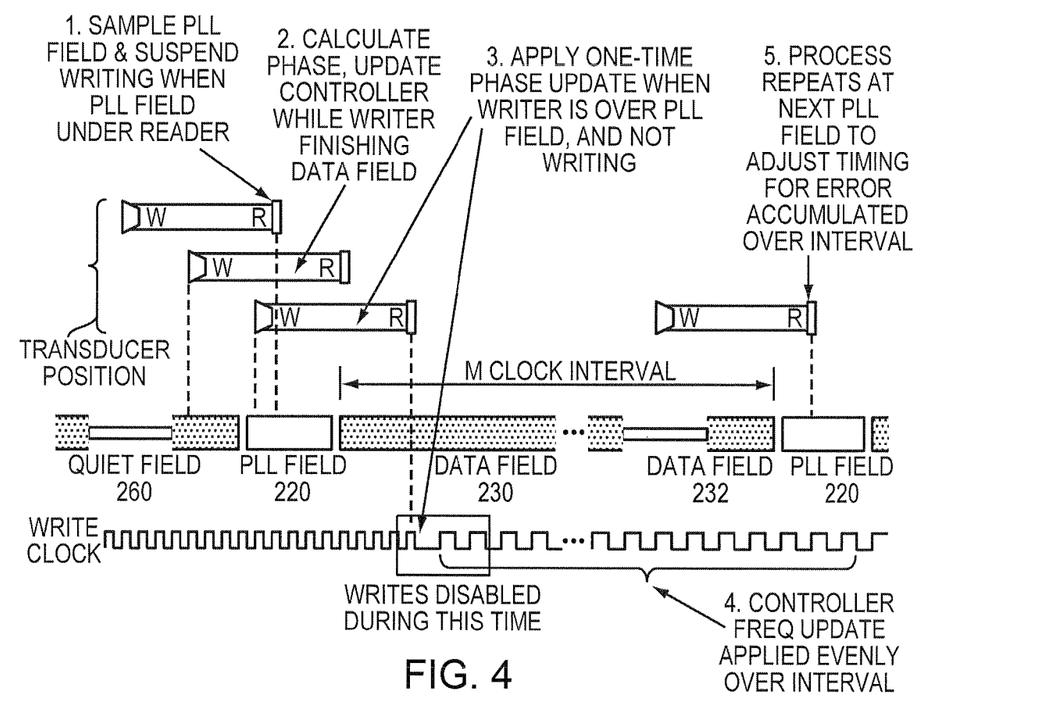
FIG. 4 illustrates an example sequence of events for write clock control as relative to the format.

FIG. 4 illustrates the sequence of events for write clock control relative to the format of the media. First ("1"), a PLL field 220 is read by reader 250, and data writing is suspended (thus, quiet field 260). Second, write clock phase corrections are calculated, and third, the write clock phase and frequency control is updated. Illustratively, these second and third steps may be executed immediately after PLL field 220 is read, and before the write of the data field 230. Another implementation, as shown in FIG. 4, may complete these steps during completion of writing data field 230, or may wait until the writer is over the PLL field 220 when data writing is suspended to apply the phase and frequency control update ("2" and "3"). The controller applies a phase update as a step and a frequency update (seen as "4") over the entire interval between PLL fields as a continuously applied phase offset, until the process is repeated ("5") at the next PLL field 220.

Figure 5:
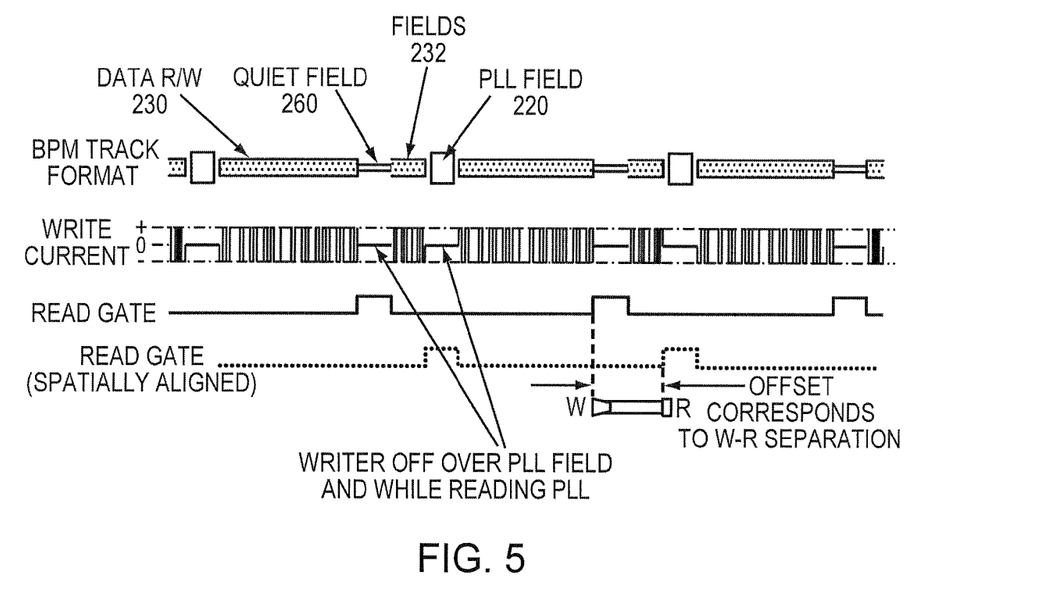
FIG. 5 illustrates an example of read and write activity when writing according to the track format of the present invention.

Referring to FIG. 5, the write current activity (of writer 240) is shown for writing the span of media, and the reader 250 activity is shown referenced to the timing of the writer (solid line) and also as spatially referenced to the track format (dotted line). Notably, the difference between the time and spatially-referenced waveforms is due to the writer-reader ("W-R") separation mentioned above. FIGS. 6-10 detail each step of the process to generate the write current activity as summarized in FIG. 5 in particular illustrating the read/write activity as a head traverses the novel format during a write operation. The steps depict a preferred sequence of detecting phase and frequency offsets and applying corrections to write clock timing. In these diagrams, the symbol referencing the read-write head consists of "W" and "R" which represent respectively the writer 240 and reader 250 elements of the head and an illustrative spacing therebetween. The head is depicted as traversing the media from left to right, with the reader ahead of the writer, and arrows beneath the writer and reader show their positions relative to the format.

Figure 6:
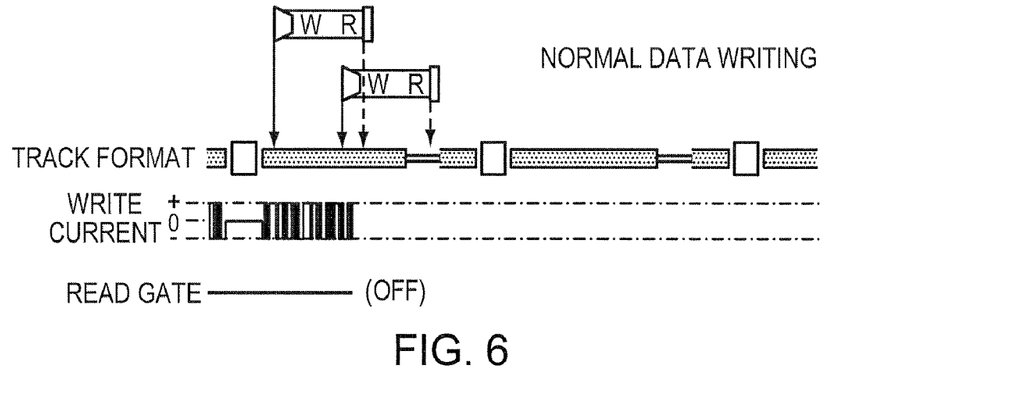
FIGS. 6-10 further illustrate the novel concepts of the present invention, detailing example steps of the process as summarized in FIG. 4 that generated the illustration in FIG. 5.

In FIG. 6, two head positions are shown where data writing commences un-interrupted. In both cases, the writer is over the data area 230, and the reader is either also over the data area, or over the quiet field 260. Note that the bias (or read) current may be turned off (i.e., no reading is taking place), though those skilled in the art will appreciate that bias current may be left on without reading any data (i.e., ignoring the read signal to thus suspend reading operations).

Figure 7:
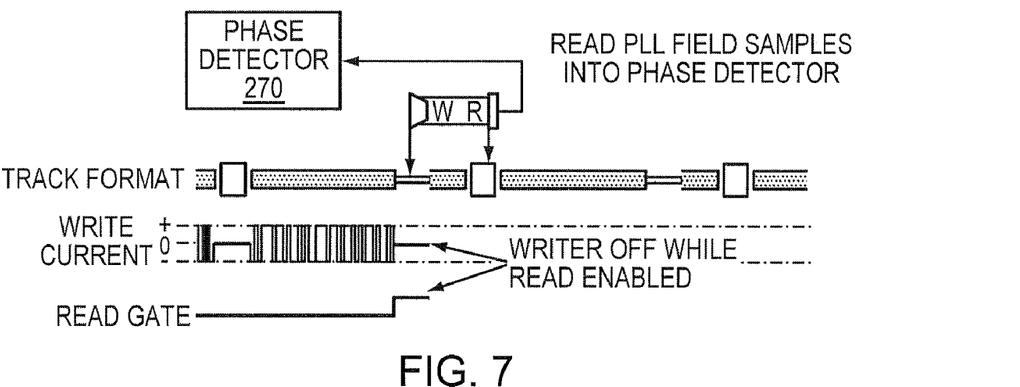

Next, as shown in FIG. 7, when the reader enters the PLL field 220, reading is enabled and the signals are read from the PLL field. During this time, data writing is suspended, and the writer may be shut off, to prevent write transitions from coupling into the read signal at the reader. A quiet field with a length substantially equal to the PLL field may result. The offset between the quiet field and the PLL field corresponds to the physical ("downtrack") separation between the writer and the reader. Note that when reading back the written data, the read head 250 reads through the quiet area 260, but discards any detected "data," thereafter splicing together the data 230 around the quiet fields.

Figure 8:
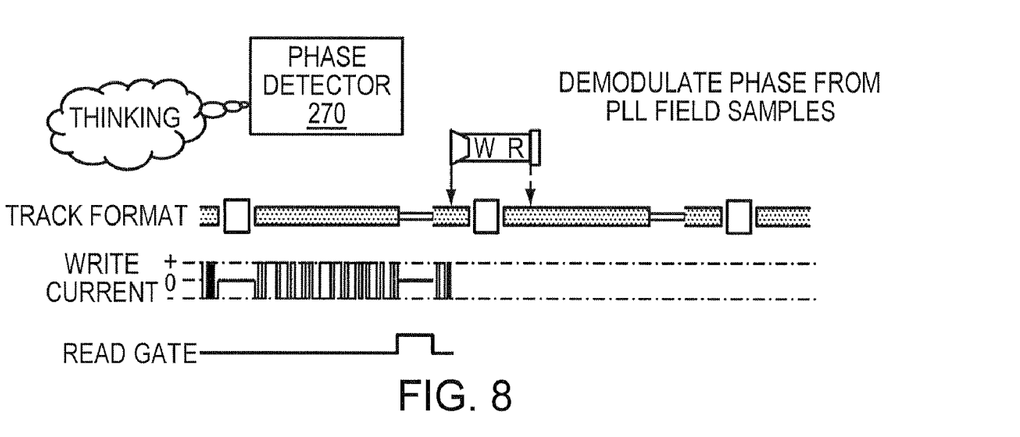

Once the PLL field has been read, writing resumes in the "runt" data field 232 between the quiet field 260 and the PLL field 220, as depicted in FIG. 8. During this time, the phase detector processes the signals read from the PLL field and computes the phase of the write clock relative to the media. Alternatively, as mentioned above, the updates to the clock may be made while the reader is within the PLL field, and as such, the clock of the runt data field 232 is an updated clock. (Note also, that where the separation between the writer and reader is not greater than the PLL field length, runt data field 232 need not be present.)

Figure 9:
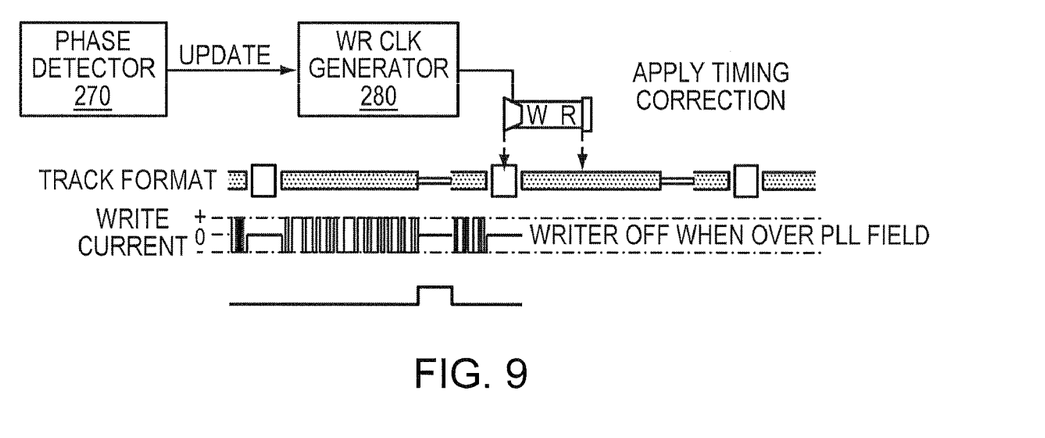
Figure 10:
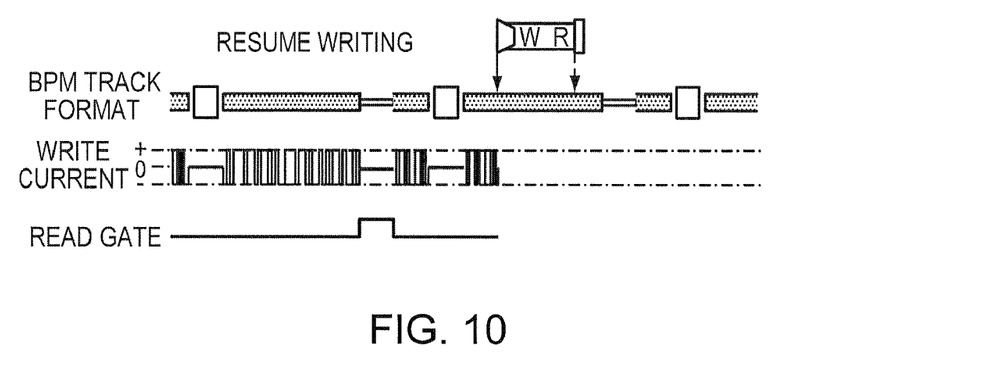

Then, in FIG. 9, when the writer 240 traverses the pre-recorded (read-only) PLL field 220, write current may be turned off. During this time, a write clock generator 280 updates the write clock based on the phase difference of the write clock relative to the media, to synchronize the write clock to the media. An advantage of updating the write clock timing when the writer is off is that it negates the effect of any discontinuities that may result from artifacts of the implementation when applying these corrections. As shown in FIG. 10, after the writer is past the PLL field, data writing resumes with the updated write clock. The sequence of steps is repeated over respective interspersed PLL fields. Alternatively, as mentioned above, write clock phase corrections may be calculated and the write clock phase and frequency control may be updated immediately after PLL field 220 is read (or during the traversal of the PLL field), and before the write of the data field 230, such that runt data field 232 is written with an updated clock, accordingly.

Notably, during the intervals between PLL fields, phase error due to disturbances, such as vibrations, may accumulate. As noted, the frequency tolerance and interval between PLL fields is chosen to insure that under sustained operating conditions, the accumulated phase error stays within the limits required for reliable writing. In the case of more severe disturbances, the accumulated error may exceed these limits, causing errors in an ongoing write operation.

Figure 11:
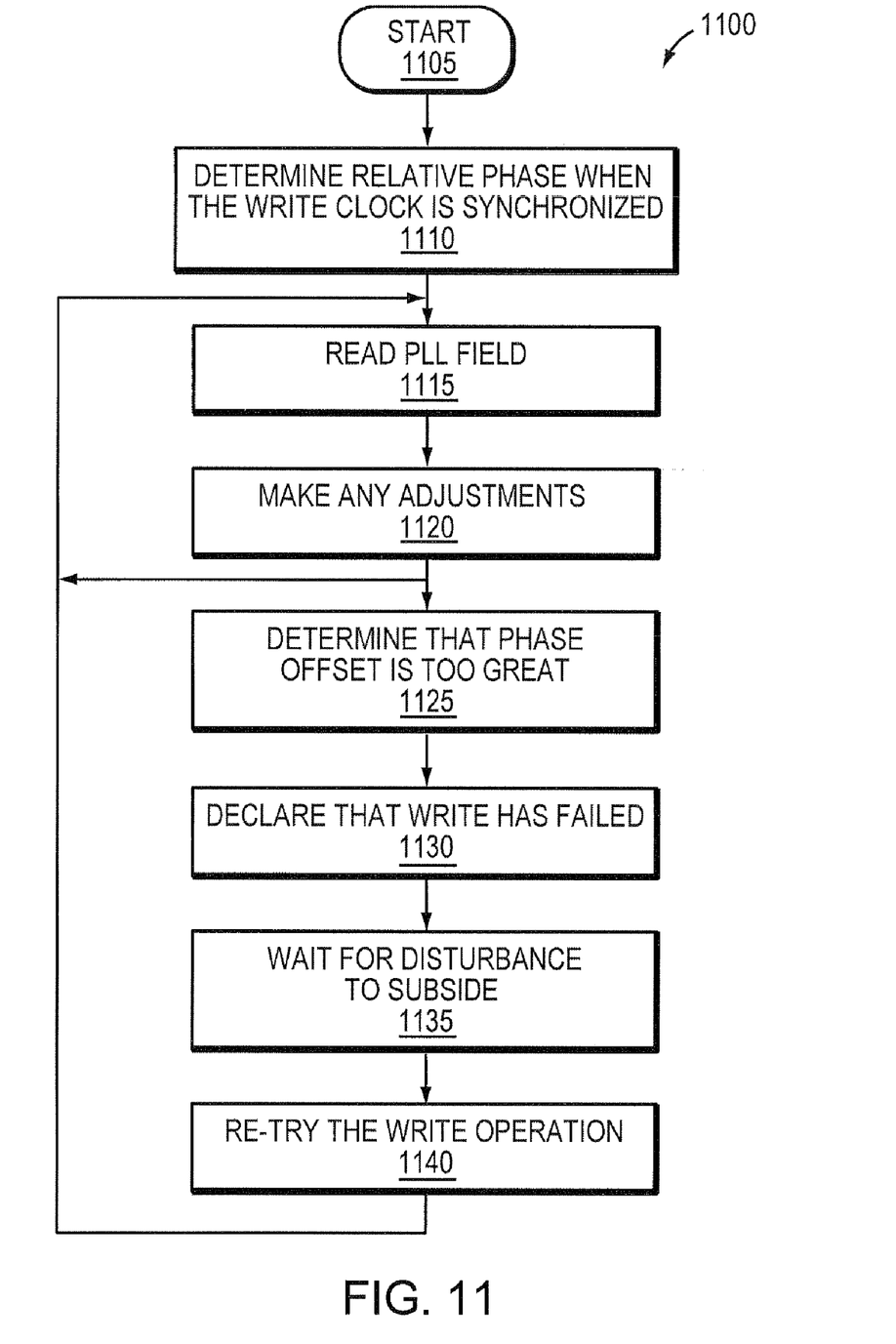
FIG. 11 is a flowchart illustrating a procedure for confirming write operations in accordance with an aspect of the present invention.

Advantageously, with the use of interspersed PLL fields, such error can be readily detected. In accordance with another aspect of the present invention, therefore, a rule may be imposed that any write operation, e.g., in a given data field (230/232), is not considered to have succeeded until the phase error of the write clock is evaluated at a subsequent PLL field. FIG. 11 is a flowchart illustrating a procedure 1100 for confirming write operations in accordance with the present invention. When the process starts at step 1105, the system is aware of the constant phase offset between the reader and writer, which is based on the separation of the reader and writer (determined in step 1110). In particular, because of the separation, aligning the write clock based on the read PLL signals requires a known phase offset to counteract the physical spacing of the reader and the writer (e.g., a 16-degree phase offset, merely an example).

Assume, for example, that measurements obtained after reading a first PLL field (step 1115) correspond to a write clock phase offset being 15 degrees from the read signals. Since the known phase shift is 16 degrees, then the write clock has drifted 1 degree from the media timing, and a small 1 degree phase shift adjustment is made to correct the write clock to the desired offset (step 1120). If a next PLL returns a phase offset of 17 degrees, then another small 1-degree adjustment is made in the other direction. If, however, a PLL field demodulation returns a phase offset of 40 degrees, a 24-degree difference from the known (example) 16-degree offset, then it may be determined (e.g., based on a preconfigured phase offset threshold, step 1125) that something has happened since the last interspersed PLL field, and the previously written data field 230 is assumed to have been written incorrectly (i.e., failed).

Upon declaration that a write has failed (step 1130), the disk controller may wait for the disturbance to subside (1135), and re-try the write operation (1140), typically in the same place on a subsequent revolution of the disk, once timing has been settled and reacquired. Notably, the write operation may rewrite the entire sector, or only the data that was written across data fields 230/232 leading to the PLL field 220 used to detect the error. This provides for reliable write operation even in the presence of occasional disturbances that exceed what is tolerable for sustained write operation.

Advantageously, the novel invention provides clock synchronization techniques for data storage media, particularly for the tolerances of efficient use of BPM capacity. In particular, by using interspersed PLL fields in a manner as described above, tightly accurate write clock synchronization may be maintained over the course of the media. That is, write clock timing may be updated based on a reading of the interspersed PLL fields, and then coasted between PLL fields, where phase jitter of the write clock between PLL fields is kept within a budgeted limit. If the clock synchronization coasts to an unacceptable level by a next PLL field, the write (or read) is failed appropriately. Further, the techniques herein also alleviate the need for read-while-write operations and components, such as where the interspersed PLL fields are being read.

While there has been shown and described an illustrative embodiment that provides clock synchronization techniques for data storage media, particularly for the tolerances of efficient use of BPM capacity, it is to be understood that various other adaptations and modifications may be made within the spirit and scope of the present invention. For example, the invention has been shown and described herein for use with particular forms of magnetic media. However, the invention in its broader sense is not so limited, and may, in fact, be used with other suitable data storage forms (e.g., with conventional magnetic media). Also, while the invention has been shown using various distances, tolerances, layouts, etc., other values/layouts may be used in accordance the present invention where applicable.

The foregoing description has been directed to specific embodiments of this invention. It will be apparent, however, that other variations and modifications may be made to the described embodiments, with the attainment of some or all of their advantages. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for providing media-referenced timing for operations on a data storage medium, the method comprising:
   providing a writer and a reader that are separated by a physical distance that is greater than a distance for the reader to traverse a select Phase-Locked Loop (PLL) synchronization field;
   reading, by the reader, PLL fields interspersed within data fields of the medium to obtain timing measurements, the PLL fields pre-recorded at predetermined intervals on the medium and having a fixed number of dots of the bit patterned medium between the PLL fields; and
   controlling a phase and frequency of a write clock based on the read PLL fields to translate the timing measurements from the PLL fields into phase and frequency corrections to synchronize the write clock to the data storage medium.

2. The method as in claim 1, further comprising:
   performing write operations based on the controlled write clock.

3. The method as in claim 1, further comprising:
   suspending write operations while the reader is reading a PLL field.

4. The method as in claim 1, further comprising:
   using the PLL fields as logical block boundaries for written data.

5. A method for creating a data storage medium for use with media-referenced timing for operations on the medium, the method comprising:
   generating a plurality of dots on the medium to which data may be written in a plurality of data fields;
   determining a Phase-Locked Loop (PLL) interval for the medium, the PLL interval based on a magnitude and bandwidth of tolerable timing disturbances; and
   writing PLL synchronization fields interspersed within data fields of the medium, the PLL fields pre-written on the medium at the PLL interval and being radially coherent within zones of the medium to have a fixed distance of dots of the bit patterned medium between the PLL fields of each zone.

6. The method as in claim 1, further comprising:
   writing data to an additional area after the suspended write operations and before the writer reaches the select PLL field.

7. The method as in claim 6, further comprising:
   writing data to the additional area based on timing measurements obtained from reading a previous PLL field to the select PLL field.

8. The method as in claim 5, further comprising:
   suspending writing while the writer is located over a PLL field.

9. The method as in claim 5, further comprising:
   writing data after a first PLL field;
   reading a next PLL field;
   determining, from reading the next PLL field, that the timing measurements are offset from an expected measurement by an amount greater than a configurable threshold; and
   in response, declaring the written data as a failed write.

10. The method as in claim 9, further comprising:
    re-writing the data after the first PLL.

11. The method as in claim 9, further comprising:
    rewriting an entire data sector associated with the written data.

12. The method as in claim 5, wherein determining the PLL interval further comprises:
    determining a maximum allowable coast time between PLL fields; and
    setting the PLL interval as a distance less than the maximum allowable coast time.

13. A data storage medium for use with media-referenced timing for write operations on the medium, the medium comprising:
    a plurality of dots on the medium to which data may be written;
    a plurality of permanent servo sectors on the medium, the servo sectors dividing the medium into a plurality of data fields; and
    a plurality of Phase-Locked Loop (PLL) synchronization fields interspersed within data fields of the medium, the PLL fields permanently written between the servo sectors on the medium at a PLL interval determined based on a magnitude and bandwidth of tolerable timing disturbances, the PLL fields being radially coherent within zones of the medium to have a fixed distance of dots of the bit patterned medium between the PLL fields of each zone.

14. The medium as in claim 13, wherein the medium is a magnetic medium.

15. An apparatus for performing write operations on a data storage medium having media-referenced timing, the apparatus comprising:
    a write clock;
    a writer configured to write data to writeable dots of the medium based on the write clock;
    a reader separated from the writer by a physical distance that is greater than a distance for the reader to traverse a select Phase-Locked Loop (PLL) synchronization field, the reader configured to read PLL fields interspersed within data fields of the medium to obtain timing measurements, the PLL fields pre-recorded at predetermined intervals between servo sectors on the medium and having a fixed number of dots of the bit patterned medium between the PLL fields; and
    a phase controller configured to control a phase and frequency of the write clock based on the read PLL fields to translate the timing measurements from the PLL fields into phase and frequency corrections to synchronize the write clock to the data storage medium.

16. The apparatus as in claim 15, wherein the writer is configured to suspend write operations while the reader is reading a PLL field.

17. The apparatus as in claim 16, wherein the writer is configured to write data to an additional area after the suspended write operations and before the writer reaches the select PLL field.

18. The apparatus as in claim 15, wherein the writer is configured to suspend write operations while the writer is located over a PLL field.

19. The apparatus as in claim 15, wherein the apparatus is a disk drive.

* * * * *